Feb. 16, 1932.　　　L. A. DOOLITTLE　　　1,844,946
MOTION PICTURE PROJECTING MACHINE
Filed March 19, 1930　　2 Sheets-Sheet 1

Witness
H. Woodard

Inventor
L. A. Doolittle
By H. R. Wilson &co.
Attorneys

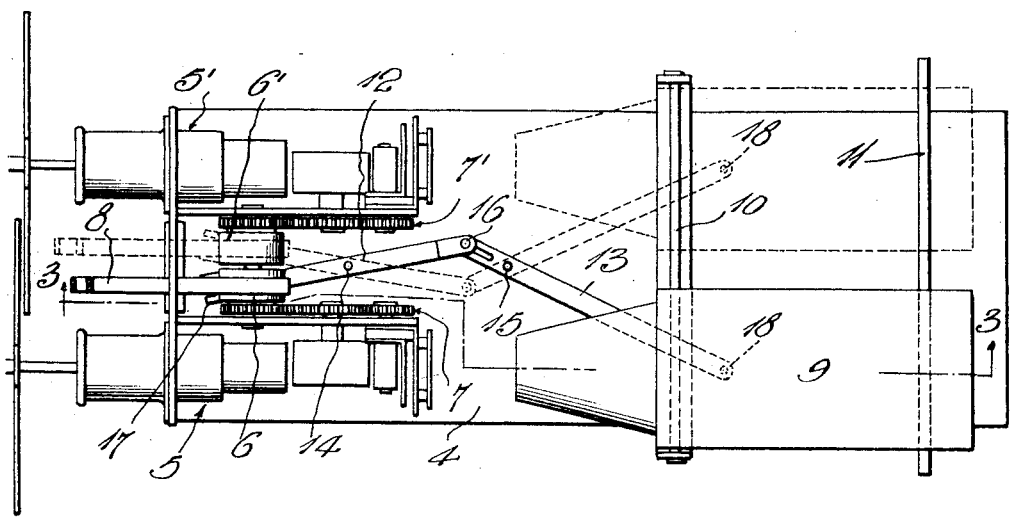

Patented Feb. 16, 1932

1,844,946

UNITED STATES PATENT OFFICE

LOUIS ALLEN DOOLITTLE, OF ST. PETERSBURG, FLORIDA

MOTION PICTURE PROJECTING MACHINE

Application filed March 19, 1930. Serial No. 437,102.

The invention relates to a motion picture projector in which a single lamp box is shiftable to an operable position behind either of twin projectors, and it aims to provide novel means whereby said lamp box constitutes an actuator for drive-controlling means, the arrangement being such that upon shifting of the lamp box to a position behind either projector, driving of the latter will be effected and driving of the other projector discontinued to allow re-threading.

With the foregoing and minor objects in view, the invention resides in the novel subject matter hereinafter described and claimed, description being accomplished by reference to the accompanying drawings:

Fig. 2 is a top plan with a number of parts removed.

Fig. 3 is a vertical longitudinal sectional view substantially on line 3—3 of Fig. 2.

Figure 1:
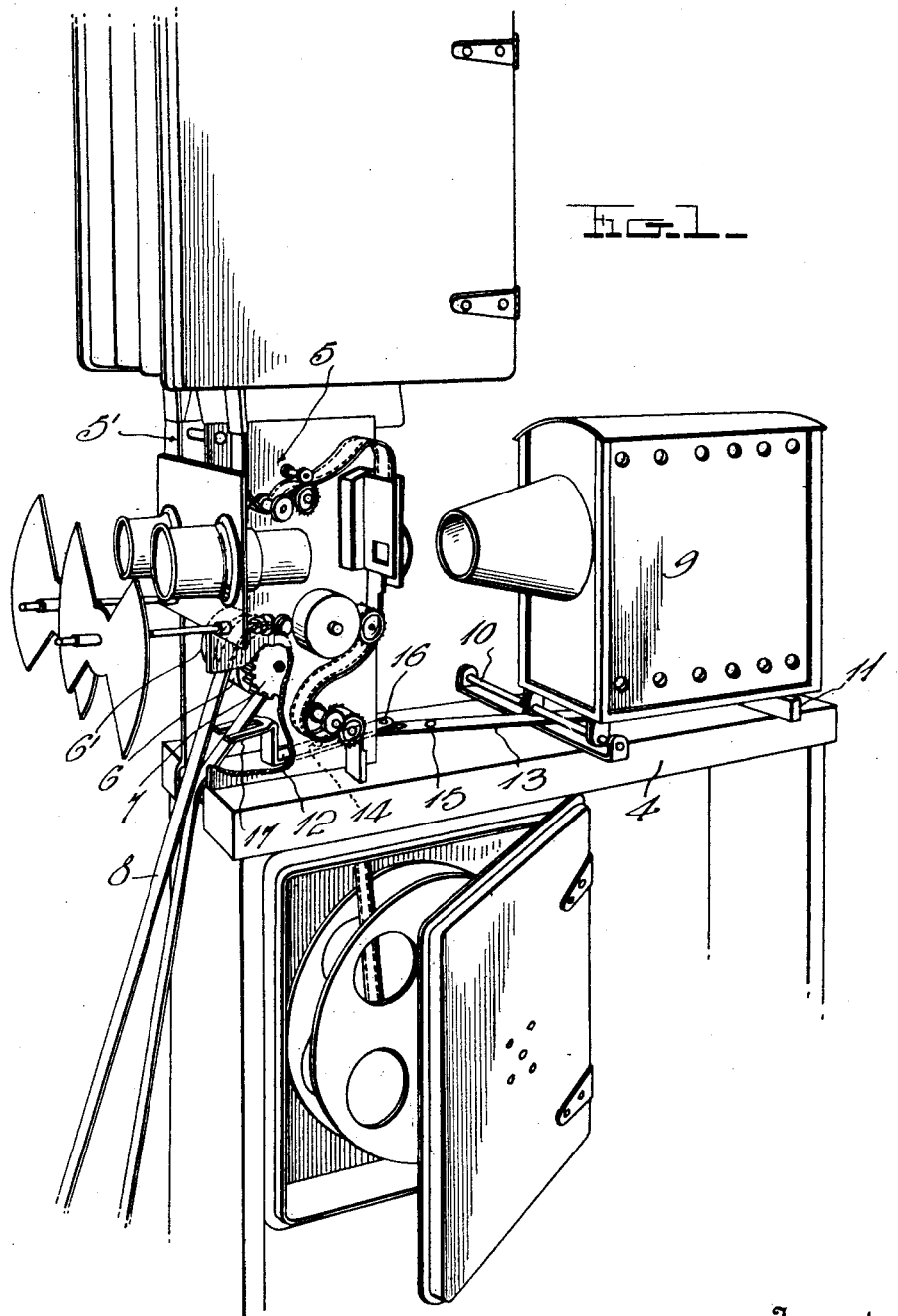
Fig. 1 is a perspective view partly broken away and in section.

The drawings above briefly described, illustrate one embodiment of the invention and while this embodiment will be rather specifically described, it is to be understood that within the scope of the invention as claimed, variations may be made.

The numeral 4 denotes an elevated support upon which twin projectors 5 and 5' are mounted side by side, each projector being of conventional form insofar as most features of construction are concerned. These two projectors are provided with individual driving pulleys 6 and 6' for the usual shutters and film-feeding means, and the gearing 7 and 7' may be considered as portions of the driving means between said pulleys, shutters and film-feeding means. As the exact manner in which the pulleys 6 and 6' drive the conventional parts of the projectors, has nothing to do with the present invention, I have not gone into detail on this drive.

The two pulleys 6 and 6' are axially alined horizontally and are disposed in close proximity to each other, and a motor-driven belt 8 is engageable with the pulley 6 to actuate the projector 5, or with the pulley 6' to drive the projector 5'.

A lamp box 9 is mounted upon the base 4 on suitable guides 10 and 11, so that it may be manually shifted to a position behind and in operative relation with either the projector 5 or the projector 5', and novel provision is made, actuated by shifting of the lamp box 9 for shifting the belt 8 to effect driving of the projector behind which the lamp box is positioned.

The belt shifting means preferably comprises a horizontally disposed lever mechanism mounted upon the base 4, and in the present showing, said lever mechanism comprises a front lever 12 and a rear lever 13, the two levers being fulcrumed between their ends upon the base 4, as denoted at 14 and 15 respectively, and being slidably and pivotally connected with each other at 16. The front end of lever 12 is provided with a belt shifting fork or the like 17 engaging the belt 8, and the rear end of lever 13 is pivoted at 18 to the bottom of the lamp box 9.

When the box 9 is positioned behind the projector 5 for co-action with the latter, the levers 12 and 13 stand as shown in Figs. 1 and 2 and the belt 8 is engaged with the driving pulley 6 of said projector 5, thereby effecting operation of the latter. When the end of the film handled by the projector 5 is reached and the film of the projector 5' is to be shown, it is simply necessary to laterally shift the lamp box 9 to a position behind said projector 5'. This movement of the lamp box swings the levers 12 and 13 and effects shifting of the belt 8 from the pulley 6 onto the pulley 6'. Thus, the projector 5' is driven and the projector 5 is stopped so that the next film can be threaded through it. Hence, with the simple mechanism which I have produced, a continuous show may be given as advantageously as if two complete motion picture machines were installed, each having its own lamp box.

Attention is again invited to the fact that within the scope of the invention as claimed, variations may be made.

I claim:

1. In a motion picture projecting machine, twin projectors disposed side-by-side and having individual driving pulleys, said pulleys being axially alined and in close proximity to each other, a drive belt engageable with either of said pulleys, belt-shifting means for shifting said belt onto either of said pulleys, and a shiftable lamp box mounted for movement to an operative position behind either projector, said lamp box being connected with said belt-shifting means in such manner that simultaneously with positioning of the lamp box behind either projector, the belt will be shifted to drive said projector.

2. In a motion picture projecting machine, twin projectors disposed side by side and having individual driving pulleys, said pulleys being axially alined and in close proximity to each other, a drive belt engageable with either of said pulleys, belt shifting means for shifting said belt onto either of said pulleys, and a shiftable lamp box connected with said belt shifting means and constituting an actuator therefor, said lamp box being movable to an operative position behind either projector and through the medium of said belt shifting means serving to cause driving of the projector behind which it is positioned.

3. In a motion picture projecting machine, a base, twin projectors secured to said base and disposed side by side, said projectors having individual driving pulleys axially alined and disposed above the base, a drive belt engageable with either of said pulleys and extending downwardly therefrom, belt shifting lever mechanism mounted on said base, operatively connected with said belt and extending rearwardly from said projectors, a lamp box connected with the rear end of said lever mechanism and constituting an actuator therefor, and means mounting said lamp box on said base for movement to an operative position behind either of said projectors, whereby shifting of said lamp box will actuate said belt shifting lever mechanism to cause driving of the projector behind which the lamp box is positioned.

4. In a motion picture projecting machine, a base, twin projectors secured to said base and disposed side-by-side, said projectors having individual driving pulleys axially alined and disposed above the base, a drive belt engageable with either of said pulleys and extending downwardly therefrom, belt-shifting lever mechanism mounted on said base, operatively connected with said belt and extending rearwardly from said projec- tors, a lamp box connected with the rear end of said lever mechanism, and means mounting said lamp box on said base for movement to an operative position behind either of said projectors, said lever mechanism insuring that simultaneously with positioning of the lamp box behind either projector, the belt will be shifted to drive said projector.

In testimony whereof I have hereunto affixed my signature.

LOUIS ALLEN DOOLITTLE.